(12) United States Patent
Sato et al.

(10) Patent No.: US 6,687,296 B1
(45) Date of Patent: Feb. 3, 2004

(54) APPARATUS AND METHOD FOR TRANSFORMING PICTURE INFORMATION

(75) Inventors: Kazushi Sato, Kanagawa (JP); Yu Liu, Tokyo (JP); Naofumi Yanagihara, Tokyo (JP)

(73) Assignee: Sony Corporation, Tokyo (JP)

( * ) Notice: Subject to any disclaimer, the term of this patent is extended or adjusted under 35 U.S.C. 154(b) by 233 days.

(21) Appl. No.: 09/708,255

(22) Filed: Nov. 7, 2000

(30) Foreign Application Priority Data

Nov. 17, 1999 (JP) .......................................... P11-327263

(51) Int. Cl.$^7$ ................................................. H04N 7/26
(52) U.S. Cl. ................................................. 375/240.12
(58) Field of Search ........................... 375/240, 240.01, 375/240.12, 240.26; 348/409.01, 412.01, 845; 345/405; H04N 7/26

(56) References Cited

U.S. PATENT DOCUMENTS 5,889,561 A * 3/1999 Kwok et al. ................. 345/405
5,907,374 A * 5/1999 Liu ............................. 348/845

FOREIGN PATENT DOCUMENTS

AT       1 005 232 A2 * 5/2000 ............ H04N/7/26

OTHER PUBLICATIONS

S. Chen et al., "A Fast Computational Algorithm for the Discrete Cosine Transform," IEEE Transactions on Communications, vol. COM–25, No. 9, Sep. 1977, pp. 1004–1009.

Z. Wang, "Fast Algorithms for the Discrete W Transform and for the Discrete Fourier Transform," IEEE Transactions on Acoustics, Speech, and Signal Processing, vol. ASSP–32, No. 4, Aug. 1984, pp. 803–816.

J. Katto & M. Ohta, "Mathematical Analysis of MPEG Compression Capability and its Application to Rate Control," Technical Report of the IEICE, vol. IE95–10, Apr. 1995, pp. 71–78.

* cited by examiner

*Primary Examiner*—Chris Kelley
*Assistant Examiner*—Tung Vo
(74) *Attorney, Agent, or Firm*—Sonnenschein, Nath & Rosenthal LLP

(57) ABSTRACT

An apparatus and a method for transforming picture information can significantly reduce the bit rate. A picture information transform apparatus for receiving as input the compressed picture information obtained by coding the picture information of a plurality of picture type images by ways of orthogonal transform and motion compensation includes a variable length decoder 4 for performing a variable length decoding operation on the input compressed picture information, an inverse quantizer 5 for inversely quantizing the decoded information, a band limiter 7 for limiting the bandwidth, a quantizer 8 and a bit rate controller 9 for computationally determining the target bits for the coded images of each picture type by adaptively using a plurality of parameters operating as coefficients for the contents of the coded images of the picture type on the bais of the contents of the coded images of the picture type.

10 Claims, 16 Drawing Sheets

|   |   |   |   |   |   |   |   |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG.2A

|   |   |   |   |   |   |   |   |
|---|---|---|---|---|---|---|---|
| 0 | 4 | 6 | 20 | 22 | 36 | 38 | 52 |
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

FIG.2B

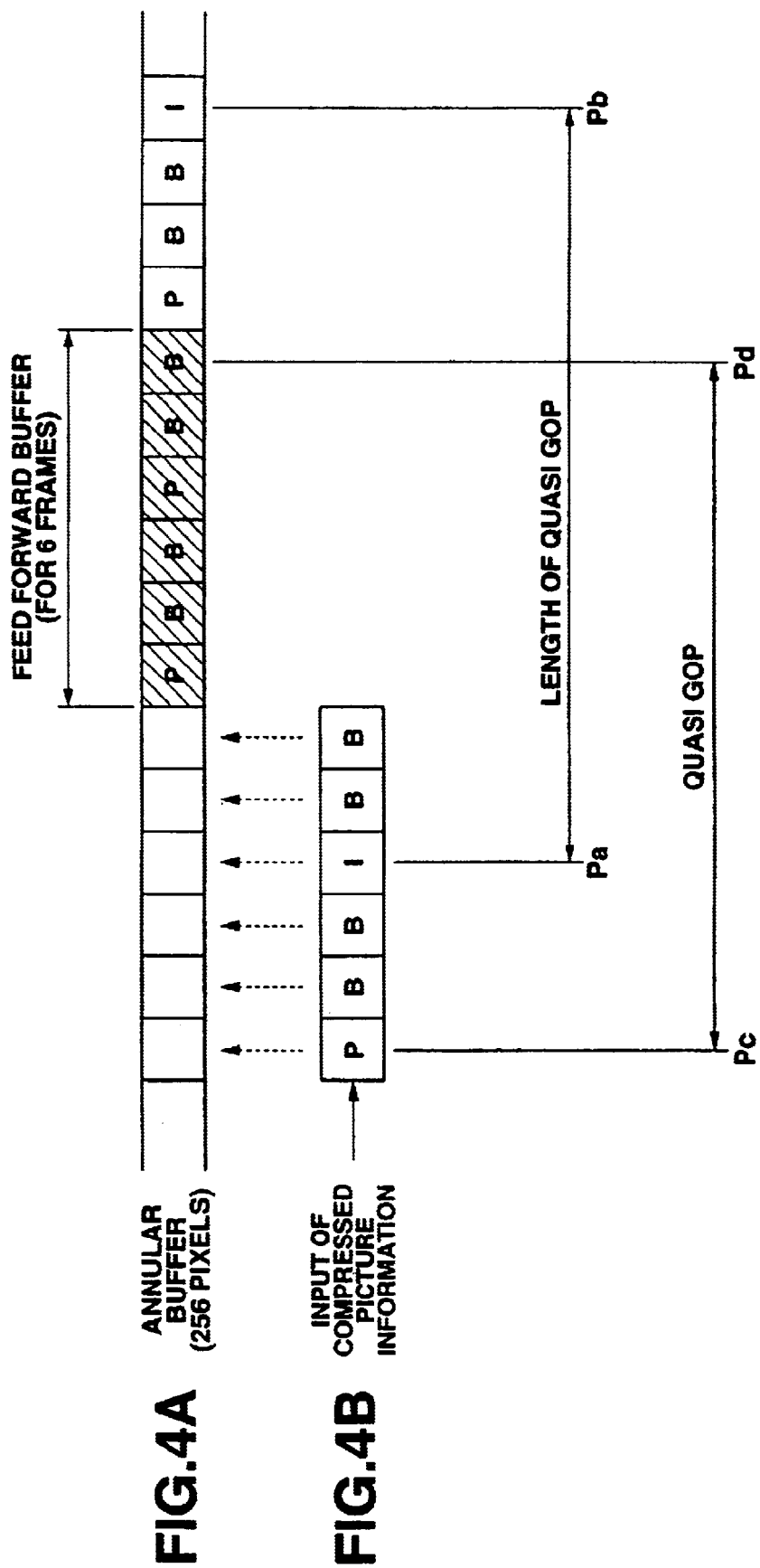

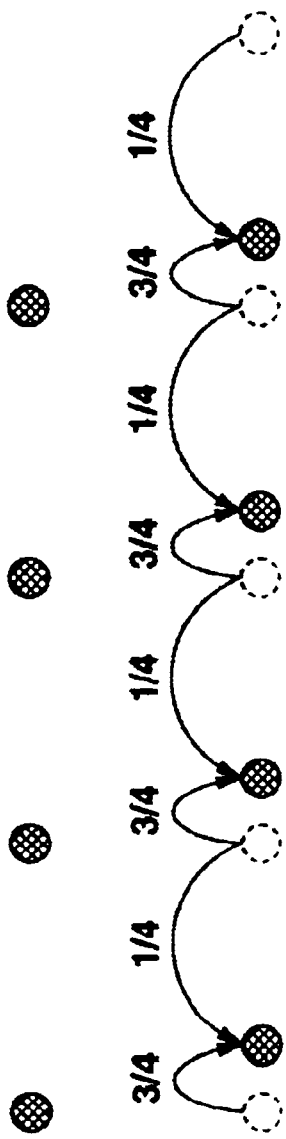
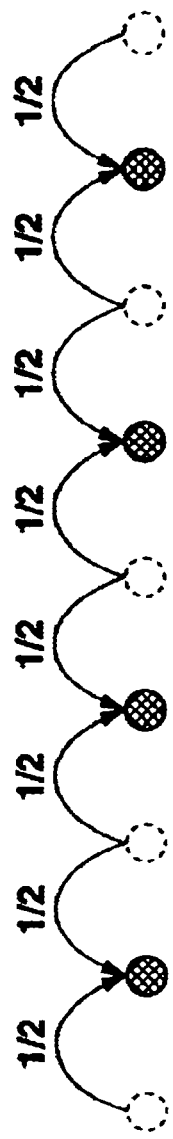
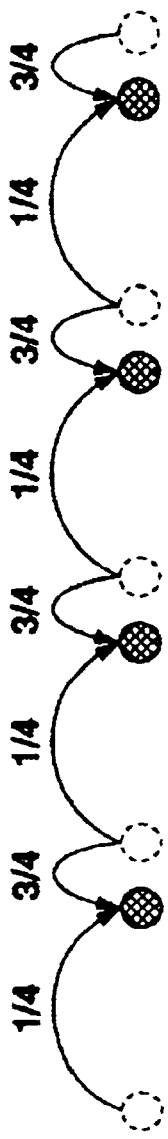
FIG.7A  mv = 0
FIG.7B  mv = 1/4
FIG.7C  mv = 1/2
FIG.7D  mv = 3/4

$$[iD_{4\_ave}] = \begin{bmatrix} 0 & 0 & 0 & \frac{1}{2} & 0 & 0 & 0 & 0 \\ 0 & 0 & 0 & \frac{1}{2} & 0 & 0 & 0 & 0 \\ 0 & 0 & \frac{1}{2} & 0 & 0 & 0 & 0 & 0 \\ 0 & 0 & \frac{1}{2} & 0 & 0 & 0 & 0 & 0 \\ 0 & \frac{1}{2} & 0 & 0 & 0 & 0 & 0 & 0 \\ 0 & \frac{1}{2} & 0 & 0 & 0 & 0 & 0 & 0 \\ \frac{1}{2} & 0 & 0 & 0 & 0 & 0 & 0 & 0 \\ \frac{1}{2} & 0 & 0 & 0 & 0 & 0 & 0 & 0 \end{bmatrix} \quad [iD_8] = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{bmatrix}$$

FIG.9A

$$[iD_{4\_decl}] = \begin{bmatrix} 0 & 0 & 0 & 0 & 0 & 0 & 0 & 0 \\ 0 & 0 & 0 & 1 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \end{bmatrix} \quad [iD_8] = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{bmatrix}$$

FIG.9B

APPARATUS AND METHOD FOR TRANSFORMING PICTURE INFORMATION

BACKGROUND OF THE INVENTION

1. Field of the Invention

This invention relates to an apparatus and a method for transforming picture information to be suitably used for processing picture information (bit stream) compressed by means of an orthogonal transform technique such as discrete cosine transformation (DCT) and a motion compensation technique conforming to the so-called MPEG Standards when receiving the information by way of a network media such as satellite broadcasting, CATV or Internet or a storage media such as an optical disk or a magnetic disk.

2. Related Background Art

In recent years, apparatus conforming to the so-called MPEG Standards and adapted to encode picture information into digital data typically by means of an orthogonal transform technique and a motion compensation technique, utilizing the redundancy specific to picture information, are becoming popular for the purpose of both dissemination of information by broadcasting stations and reception of information by family members so that information may be transmitted and stored in a highly efficient way.

Particularly, the so-called MPEG-2 (ISO/IEC 13818-2) Standards are established for general purpose video coding systems and cover images obtained by interlaced scanning and progressive scanning as well as images with an ordinary resolution and high definition images so that they are expected to broaden the applicable scope both in the professional field and consumer applications.

The so-called MPEG-2 compression system can realize a high compression ratio and an excellent image quality by assigning 4 to 8 Mbps to an image obtained by interlaced scanning with an ordinary resolution and typically having 720×480 pixels and 18 to 22 Mbps to an image obtained by interlaced scanning with the high resolution and typically having 1,920×1,088 pixels.

However, the quantity of information of a high definition image is enormous and the currently available coding systems including those conforming to the MPEG Standards are still accompanied by the problem of meeting the requirement of a bit rate of 18 to 20 Mbps or more for realizing a satisfactory image quality for an image obtained by interlaced scanning of 30 Hz and having 1,920×1,080 pixels.

Therefore, it is necessary to further reduce the bit rate, taking into consideration the band width of the transmission path in the case of transmitting information by way of a network media such as satellite broadcasting or CATV or the storage capacity in the case of storing information by using a storage media schematic as optical disk or magnetic disk, while minimizing the possible degradation of image quality.

The necessity of reducing the bit rate may arise when processing the compressed picture information (bit stream) of a high definition image but also that of an image with an ordinary resolution (e.g., an image obtained by interlaced scanning of 30 Hz and having 720×480 pixels) for a network media or a storage media as described above.

Techniques of hierarchical coding (scalability) and picture information transform (transcoding) have been proposed as means for solving the above identified problem.

With regard to hierarchical coding (scalability), the SNR (signal to noise ratio) scalability is standardized in MPEG-2 so that it is possible to hierarchically encode high SNR compressed picture information (bit stream) and low SNR compressed picture information (bit stream) according to it.

However, while the restrictions in terms of band width or storage capacity have to be known at the time of coding for hierarchical coding, they are practically unknowable in almost any actual situations.

From this point of view, picture information transform (transcoding) may find more practical applications in actual systems.

An picture information transform apparatus (transcoder) basically comprises a decoder for entirely or partly decoding the input compressed picture information (bit stream) and an encoder for re-encoding the output of the decoder that are connected in parallel and information (pixel data) may be delivered from the decoder to the encoder either in a space region or in a frequency region.

While the arrangement of delivering information (pixel data) in a space region requires a large quantity of data to be processed, the degradation of the quality of the decoded image obtained from the output compressed information (bit stream) can be minimized. This arrangement find applications mainly in broadcasting equipment.

On the other hand, the arrangement of delivering information (pixel data) in a frequency region requires less data to be processed so that it finds applications mainly in home use equipment, although the image quality may be degraded to a greater extent if compared with the former arrangement.

Meanwhile, known picture information transform apparatus are accompanied by the problem of degradation of image quality such as block distortion as a result of limiting the bandwidth in order to reduce the bit rate of compressed picture information (bit stream).

Additionally, known picture information transform apparatus are not satisfactory in terms of the extent of reduction of the bit rate of compressed picture information (bit stream).

BRIEF SUMMARY OF THE INVENTION

In view of the above identified problems, it is therefore the object of the present invention to provide a method and an apparatus for transforming picture information that can satisfactorily suppress the degradation of coding quantity due to a limited bandwidth and reduce the bit rate of compressed picture information.

According to the invention, the above object is achieved by providing a picture information transform apparatus for receiving as input the compressed picture information of a plurality of picture type obtained by coding the picture information by means of orthogonal transform and motion compensation, said apparatus comprising:

a decoding means for decoding the input compressed picture information to the picture information;

a coding means for coding the picture information obtained by the decoding of said decoding means; and a control means for controlling the target coding quantity of each of the coded pictures of respective picture type by adaptively using a plurality of parameters to be used as coefficients of the contents of each of the coded pictures of respective picture type on the basis of the contents of each of the coded pictures of respective picture type at the time of coding by said coding means.

In another aspect of the invention, there is provided a picture information transform method for receiving as input the compressed picture information of a plurality of picture type obtained by coding the picture information by means of orthogonal transform and motion compensation, said method comprising:

a decoding step for decoding the input compressed picture information to the picture information;

a coding step for coding the picture information obtained by the decoding of said decoding step; and a control step for controlling the target coding quantity of each of the coded pictures of respective picture type by adaptively using a plurality of parameters to be used as coefficients of the contents of each of the coded pictures of respective picture type on the basis of the contents of each of the coded pictures of respective picture type at the time of coding by said coding step.

Preferably, a picture information transform apparatus according to the invention for receiving as input the compressed picture information (bit stream) obtained by coding the picture information of a plurality of picture type by means of techniques of orthogonal transform and motion compensation typically conforming to co-called MPEG comprises a first code buffer, a compressed information analyser, an information buffer, a variable length decoder and inverse quantizer, a first adder, a band limiter, a quantizer, a coding quantity controller, a second buffer, a variable length encoder and a motion compensation error correcting section. The coding quantity controller includes a complexity computing section and a target coding quantity computing section and the motion compensation error correcting section includes an inverse quantizer, a second adder, an inverse discrete cosine transform section, a video memory, a motion compensation predicting section and a discrete cosine transform section. Thus, according to the invention, an optimal coding quantity is assigned to each frame of picture in the input compressed picture information (bit stream) according to the complexity of the frame in order to minimize the coding quantity (bit rate) of the output compressed picture information (bit stream) and also the distortions that can arise as a result of the re-encoding.

Of the above arrangement, the compressed information analyser extracts coded information necessary for the subsequent processing operations by syntactically analysing the compressed picture information (bit stream) and the variable length decoder performs a variable length decoding operation on the variable length coded discrete cosine coefficients according to the information on the scanning mode (zigzag scan or alternate scan) extracted by the compressed information analyser, while the inverse quantizer inversely quantizes the discrete cosine transform coefficients according to the information on quantization (quantization scale and quantization matrix) extracted by the compressed information analyser and the band limiter reduces the resolution of image by using 0s for the high frequency coefficients of the discrete cosine transform coefficients or multiplying them with a weighting coefficient. The quantizer requantizes the discrete cosine transform coefficients by using the width of quantization corresponding to the quantity of picture information (target bit rate) of the output compressed picture information (bit stream) and the variable length encoder performs a variable length coding operation on the discrete cosine transform coefficients, wile the coding quantity controller controls the given target coding quantity and the width of quantization of the quantizer as extracted from the information buffer such that no overflow or underflow of compressed picture information may occur in the second code buffer after the variable length decoding.

Particularly, the complexity computing section of the coding quantity controller computationally determines the complexity of each frame within the input compressed picture information (bit stream) on the basis of the number of bits assigned to the frame and stored in the information buffer and the quantization scale and the target coding quantity computing section of the coding quantity controller assigns an optimal coding quantity to each frame within the output compressed picture information (bit stream) on the basis of the complexity of the frame as determined by the complexity computing section.

If the arrangement includes a motion compensation error correcting section, the motion compensation error of each macro-block is stored in the video memory and then the stored error is taken out according to the information on the motion vector and the prediction mode as extracted from the input compressed picture information (bit stream).

As pointed out above, the present invention provides a picture information transform apparatus adapted to receive compressed picture information (bit stream) conforming to so-called MPEG-2 as input and deliver data from the decoder to the encoder thereof within a DCT region, with which the degree of degradation of coding quantity due output re-encoding of the compressed picture information (bit stream) to be output that conforms to so-called MPEG-2 and shows a coding quantity (bit rate) lower than that of the input information is reduced by assigning an optimal number of bits to each frame within the input compressed picture information (bit stream), taking the complexity of the frame into consideration.

BRIEF DESCRIPTION OF THE SEVERAL VIEWS OF THE DRAWING

Of the accompanying drawing:

FIG. 2 is a schematic illustration of a scanning system where compressed picture information (bit stream) is coded by means of zigzag scan and alternate scan;

FIG. 4 is a schematic illustration of the method of forming a pseudo GOP used by the bit stream controller of the picture information transform apparatus of FIG. 1;

FIG. 7 is a schematic illustration of the theory of the operation of linear interpolation of the ¼ pixel accuracy of the motion compensation predicting section;

FIG. 9 is a schematic illustration of a method of computationally determining a matrix equivalent to a series of operations of the inverse discrete cosine transform section for processing the horizontal direction by using only the low frequency coefficients of four degrees, where the high frequency coefficients of four degrees are replaced by so many 0s and an inverse discrete cosine transform of eight degrees is carried out and then a decimating or averaging operation is conducted to output error correction values of four points in the pixel region;

DETAILED DESCRIPTION OF THE INVENTION

Now, an apparatus and a method for transforming picture information according to the invention will be described in greater detail by referring to the accompanying drawing that illustrates preferred embodiments of the invention.

Firstly, an picture information transform apparatus (transcoder) according to the invention will be described.

Figure 1:
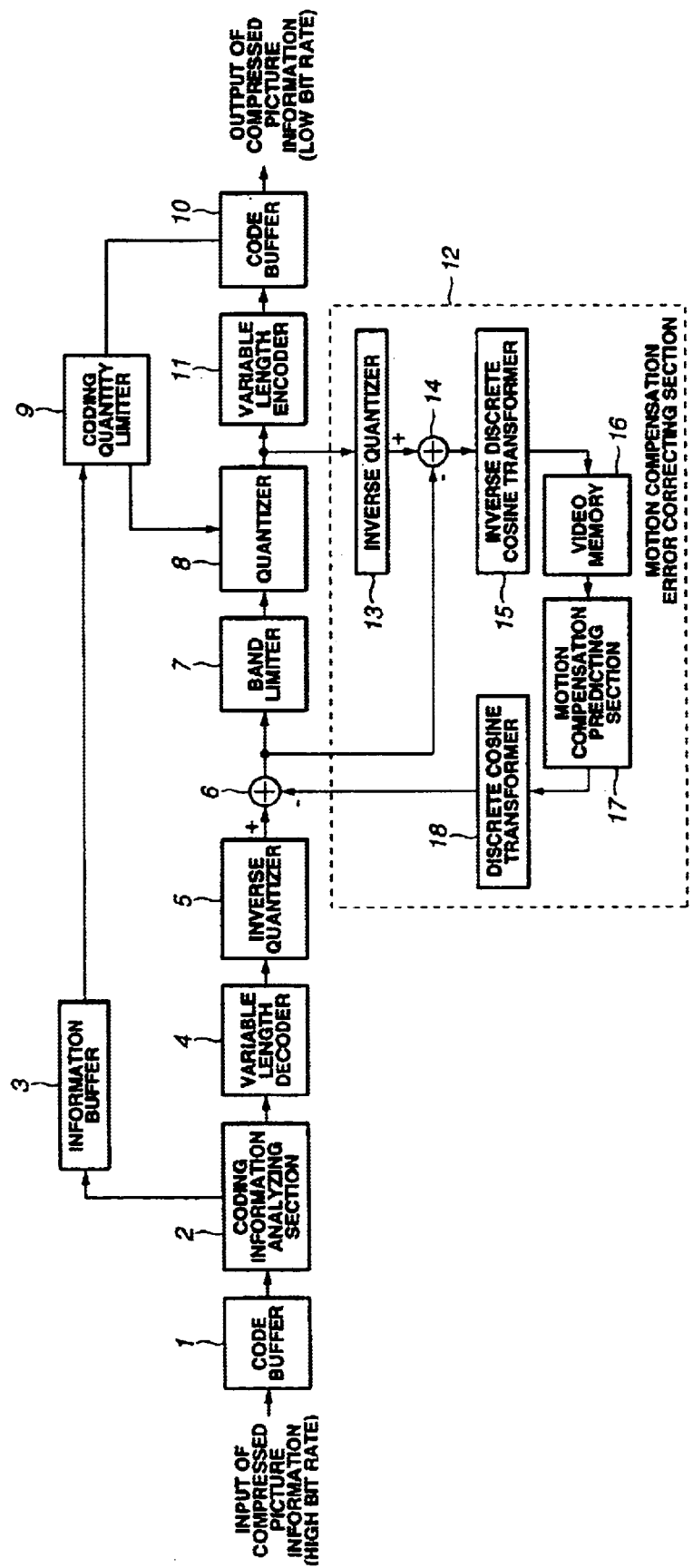
FIG. 1 is a schematic block diagram of a picture information transform apparatus adapted to deliver information (video data) from the decoder to the encoder thereof in a frequency region.

Referring to FIG. 1, this picture information transform apparatus comprises a first code buffer 1 for storing input compressed picture information, a compressed information analyser 2 for analysing the compressed picture information output from the first code buffer, an information buffer 3 for storing the compressed information output from the compressed information analyser 2 and a variable length encoder 4 for performing a variable length encoding operation on the compressed picture information output from the compressed information analyser 2.

The picture information transform apparatus further comprises an inverse quantizer 5 for inversely quantizing the picture information decoded by the variable length encoder 4, a first adder 6 for subtracting the output of the motion compensation error correcting section 12 from the output of the inverse quantizer 5, a band limiter 7 for limiting the bandwidth for the output of the first adder 6 and a bit rate controller 9 for controlling the bit rate on the basis of the output of the information buffer 3.

The picture information transform apparatus additionally comprises a i quantizer 8 that operates for quantizing on the basis of the output of the band limiter 7 and that of the bit rate controller 9, a variable length encoder 11 that performs a variable length encoding operation on the output of the quantizer 8, a motion compensation error correcting section 12 for correcting the error of motion compensation on the basis of the output of the quantizer 11 and a second code buffer 10 for storing the output of the variable length encoder 11 according to the control of the bit rate controller 9.

The motion compensation error correcting section 12 includes an inverse quantizer 13 for inversely quantizing the output of the quantizer 8, a second adder 14 for subtracting the output of the first adder 6 from that of the inverse quantizer 13 and an inverse discrete cosine transform section 15 for inversely quantizing the output of the second adder 14.

The motion compensation error correcting section 12 includes a video memory for storing the output images of the inverse discrete cosine transform section 15, a motion compensation predicting section 17 for predicting the motion compensation for the output of the video memory 16 and a discrete cosine transform section 18 for performing an operation of discrete cosine transform on the output of the motion compensation predicting section 17.

The motion compensation error correcting section 12 may be omitted if it is necessary to reduce the dimensions of the apparatus at the cost of a certain degree of degradation of image quality.

The above described picture information transform apparatus is adapted to deliver information (video data) from the variable length decoder 4 to the variable length encoder 11 in a frequency region.

Now, the operation of a picture information transform apparatus according to the invention and not comprising a motion compensation error correcting section 12 will be described below.

The input compressed picture information (bit stream) showing a high bit rate is stored in the first code buffer 1.

The compressed picture information (bit stream) is coded so as to satisfy the VBV (video buffering verifier) provided in MPEG-2, or the constraints imposed on the residue of the codes of the virtual buffer. Therefore, the first code buffer 1 would never give rise to an overflow or underflow situation.

The compressed picture information (bit stream) stored in the first buffer 1 is sent to the compressed information analyser 2, which extracts certain information from the compressed picture information (bit stream) according to the syntax defined in MPEG-2 and performs a re-encoding operation according to the extracted information.

Particularly, as described hereinafter, information on the type of coding pictures (picture_coding_type) and the quantized value (q_scale) of each macro-block that are necessary for the operation of the bit rate controller 9 are stored in the information buffer 3.

The variable length decoder 4 performs a variable length decoding operation on the coded data for the differences between the adjacent blocks with regard to the DC component of the intra-macro block that is coded in the display screen and the data coded in terms of run and level with regard to the other coefficients to obtain quantized one-dimensional discrete cosine transform coefficients.

Then, the quantized discrete cosine transform coefficients are rearranged as two-dimensional data according to either the system for zigzag scan as shown in A of FIG. 2 or the system for alternate scan as shown in B of FIG. 2 selected on the basis of the information on the image scanning mode (zigzag scan or alternate scan) as extracted by the compressed information analyser 3.

The obtained two-dimensional data of the quantized discrete cosine transform coefficients are then inversely quantized by the inverse quantizer 5 on the basis of the information on the width of quantization (quantization scale) and the quantization matrix extracted by the compressed information analyser 3.

The discrete cosine transform coefficients obtained as output of the inverse quantizer 5 are then subjected to an operation of decimating the horizontal high frequency coefficients for each block in the band limiter 7.

Figure 3A:
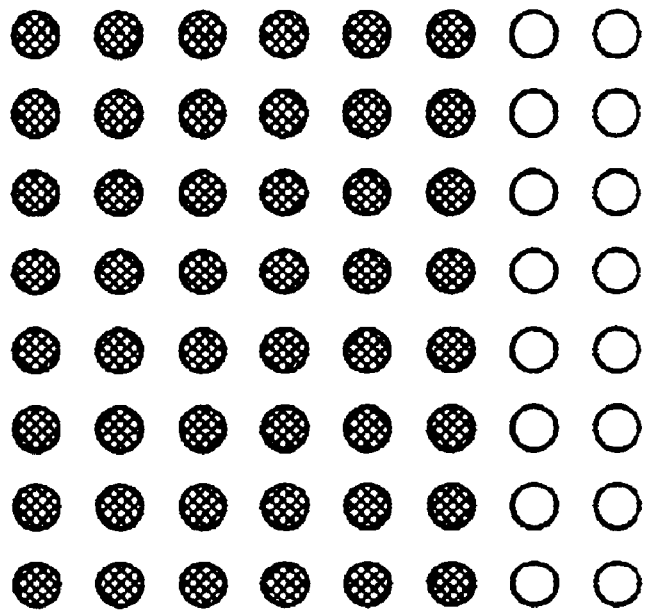
FIG. 3 is a schematic illustration of the operation of the band limiter of the picture information transform apparatus of FIG. 1.
Figure 3B:
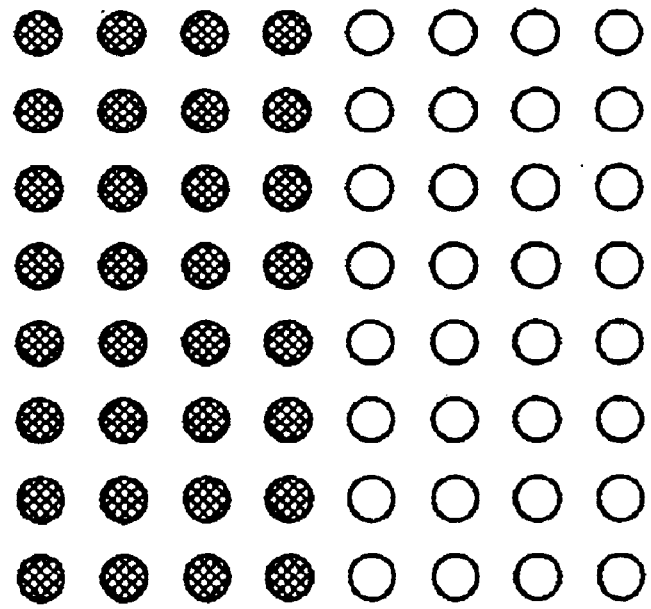

FIG. 3 schematically illustrates an example of the operation of the band limiter. In the illustrated example, of the 8×8 discrete cosine transform coefficients, only the values of 8×6 coefficients are stored for the horizontal low frequency components as shown in A of FIG. 3 and the remaining coefficients is replaced by so many 0s for the brighness signal.

As for the color difference signal, of the 8×8 discrete cosine transform coefficients, only the values of 8×4 coefficients are stored for the horizontal low frequency components as shown in B of FIG. 3 and the remaining coefficients is replaced by so many 0s.

If the input compressed picture information (bit stream) is that of an image obtained by interlaced scanning, the vertical high frequency components of the discrete cosine transform coefficients contain information on the time difference between fields in the frame discrete cosine transform mode so that the image quality can be degraded significantly if the information is limited. Therefore, no band limiting operation will be conducted in the vertical direction.

As shown in the above example, the band limiting operation is conducted more remarkably on the color difference signal than on the luminance signal because the former is less related to the possible degradation of the image quality. Thus, with this arrangement, the image distortion that can be caused by the re-quantization can be reduced, while minimizing the degradation of the image quality.

Note that FIG. 3 only shows an example of the operation of band limiter 7 and the band limiter 7 can operate in many different ways. For example, the horizontal high frequency components of the discrete cosine transform may be multiplied by a preselected coefficient instead of replacing them by so many 0s to realize a similar effect.

The 8×8 discrete cosine transform coefficients output from the band limiter 7 are quantized by the quantizer 8. The width of quantization of the quantizer 8 is determined by the bit rate controller 9 in a manner as will be described hereinafter.

Now, the operation of the bit rate controller 9 will be discussed below.

With the technique adopted in MPEG-2 Test Model 5 (ISO/IEC JTC1/SC29/WG11 N0400), in the first step, the number of bits to be assigned to each of a group of picture (GOP) is determined on the basis of the number of bits assigned to the pictures of the GOP that are not coded yet.

A GOP includes an I pictures that are Intra-coded pictures, P pictures that are Predictive-coded pictures and B pictures that are Bidirectionally predictive-coded pictures.

Then, in the second step, a quantization scale code is determined for each picture by feedback control on the basis of a unit of macro-block and the capacities of the virtual buffers of three types selected independently for each picture in order to make the number of bits assigned to each picture agree with the actual number of bits of the picture.

Thereafter, in the third step, the quantization scale code determined in the second step is further quantized according to the activity of each macro-block in such a way that it is quantized more finely in flat areas where image degradation is visually more recognizable and only roughly in complex areas where image degradation is less visually recognizable.

Picture information coding apparatus conforming to MPEG-2 that are actually marketed are controlled for the bit rate by means of the algorithm similar to the one defined for Test Model 5.

However, two problems arise when this technique is applied to the encoder of the picture information transform apparatus of FIG. 1. The first one of the problems is related to the above described first step.

More specifically, the GOP structure is given in advance in a picture information coding apparatus adapted to encode picture information according to MPEG-2 so that the processing operation of the first step can be conducted according to it. On the other hand, with the picture information transform apparatus of FIG. 1, the GOP structure comes to be known only by analyzing the syntax of all the information of a GOP of the compressed picture information (bit stream) input to it.

The length of a GOP is not necessarily fixed and there are some marketed picture information transform apparatus conforming to MPEG-2 that comprises a picture information encoder that is designed to adaptively control the length of a GOP in the compressed picture information (bit stream) by detecting a scene change.

The second problem is related to the above described third step. The activity of a picture information coding apparatus conforming to MPEG-2 is determined by using the pixel values of the luminance signal of the original image. However, the picture information transform apparatus of FIG. 2 uses compressed picture information (bit stream) according to MPEG-2 so that there is no knowing of the pixel values of the luminance signal of the original image.

In this embodiment, the first problem is dissolved by defining a pseudo GOP as described below and the bit rate is controlled on the basis of the defined pseudo GOP.

A pseudo GOP is formed by using an I picture, a plurality of P pictures and also a plurality of B pictures. Its length is variable and depends on the I picture detected in the compressed picture information (bit stream).

Now, the configuration of a pseudo GOP will be described by referring to FIG. 4.

The information buffer 3 of FIG. 1 has an annular buffer for storing the coding types of pictures (picture_coding_type) as shown in FIG. 4.

An annular buffer has a storage capacity enough for storing the coding types of pictures (picture_coding_type) of 256 pictures as defined in MPEG-2 which is same as the largest number of frames that a GOP can contain. The initial values are stored in the respective elements of the annular buffer.

Referring to FIG. 4, assume that the information of each frame contained in the compressed picture information (bit stream) is processed by P, B, B, I, B, B and the next P picture is to be processed.

Then, the coding types of the pictures (picture_coding_type) of the first several frames are read in advance from the feed forward buffer in the compressed information analyser 2 of the picture information transform apparatus of FIG. 1 and the values in the elements of the annular buffer are updated. In the instance of FIG. 4, those of the first six frames are read.

Then, the length of the pseudo GOP is determined from the status of the annular buffer by referring to the pointer $P_a$.

indicating the current I picture and the pointer $p_b$ indicating the next I picture.

Finally, the configuration of the pseudo GOP is determined from the pointer $p_d$ indicating the last frame of the feed forward buffer and the length of the pseudo GOP that is already determined.

If the determined configuration of the pseudo GOP is ($B_1$, $B_2$, $P_1$, $B_3$, $B_4$, $I_1$ $B_5$, $B_6$, ..., $P_L$, $B_{M-1}$, $B_M$), the size of the pseudo GOP, or L_pgrop, given by the formula below.

$$L\_pgop = 1 + L + M \tag{1}$$

Then, the target bits of an I picture, of $T_I$, those of a P picture, or $T_P$, and those of a B picture or $T_B$, or time block are given respectively by the formulas below:

$$T_I = \frac{K_P K_B X(I)}{K_P K_B X(I) + K_B \sum_{i \in \Omega} X(P_i) + K_P \sum_{i \in \Omega} X(B_i)} \times R, \tag{2}$$

$$T_P = \frac{K_B X(P)}{K_P K_B X(I) + K_B \sum_{i \in \Omega} X(P_i) + K_P \sum_{i \in \Omega} X(B_i)} \times R \quad \text{and} \tag{3}$$

$$T_B = \frac{K_P X(B)}{K_P K_B X(I) + K_B \sum_{i \in \Omega} X(P_i) + K_P \sum_{i \in \Omega} X(B_i)} \times R, \tag{4}$$

where $\Theta$ and $\Omega$ respectively refers to the frames that are already processed and those that are to be processed in the pseudo GOP. If the frame rate is F and the bit rate of the output compressed picture information (bit stream) is B, the following equations can be obtained.

$$R_0 = \frac{B}{F} \times L\_pgop \tag{5}$$

$$R = R_0 - \sum_{x \in \Theta} \text{generated\_bit}(x) \tag{6}$$

In the above formulas, $X(\cdot)$ represents the parameter indicating the complexity of each frame (global complexity measure). In the following description, the parameter X is referred to as complexity.

At the time of preparsing of the compressed information analyser 2 of the picture information transform apparatus of FIG. 1, the complexity X is determined by the formula below, computing in advance the total number of bits S of the frame and the average quantization scale code Q.

$$X = S \cdot Q \tag{7}$$

The quantization scale code is an index indicating the step of quantizing DCT coefficients.

$K_P$ and $K_B$ are ratios of the P picture quantization scale code and B picture quantization scale code respectively relative to the I picture quantization scale code as defined in MPEG-2 Test Model 5. It is assumed that the overall image quality is optimized when they take the respectively values shown below.

$$K_p = 1.0; K_b = 1.4 \tag{8}$$

Now, the technique of dissolving the second problem will be discussed below.

The quantization scale code Q of each macro-block in the input compressed picture information (bit stream) is computed by using the pixel values of the luminance signal of the original image at the time of encoding.

Therefore, firstly, in the preparsing operation of the compressed information analyser 2 of the picture information transform apparatus of FIG. 1, the quantization scale Q and the number of bits B of each macro-block of the frame are extracted and stored in the information buffer 3, while the average values E(Q) and E(B) of all the quantization scales Q and all the numbers of bits B of the frame or the average value E(QB) of their products are determined in advance and stored in the information buffer 3.

Then, the bit rate controller 9 computes the normalization activity N_act, using one of the formulas below on the basis of the information on the quantization scale Q and the number of bits B stored in the information buffer 6.

$$N\_act = \frac{2Q + E(Q)}{Q + 2E(Q)} \tag{9}$$

$$N\_act = \frac{2QB + E(Q)E(B)}{QB + 2E(Q)E(B)} \tag{10}$$

$$N\_act = \frac{2QB + E(QB)}{QB + 2E(QB)} \tag{11}$$

Of the above formulas, formula (10) and formula (11) are equivalent. While formula (9) may provide a better image quality when the image quality is evaluated by means of the SNR, a better subjective image quality will be provided by formula (10) or formula (11).

Now, assume that, for a macro-block, the quantization value of the input compressed picture information (bit stream) is Q1 and the value obtained by quantizing the output compressed picture information (bit stream) is Q2 as computed by the bit stream controller 12, using the above technique.

Since the picture information transform apparatus of FIG. 1 is adapted to reduce the bit rate, the macro-block that is once roughly quantized is now finely quantized as a result of the requantization if Q1>Q2.

The distortion that arises as a result of a rough quantization is not reduced by a subsequent fine requantization.

Additionally, since a large number of bits are used for the macro-block, the number of bits assigned to other macro-blocks is reduced to further degrade the image quality.

Therefore, if Q1=Q2 will be obtained if Q1>Q2.

Figure 5:
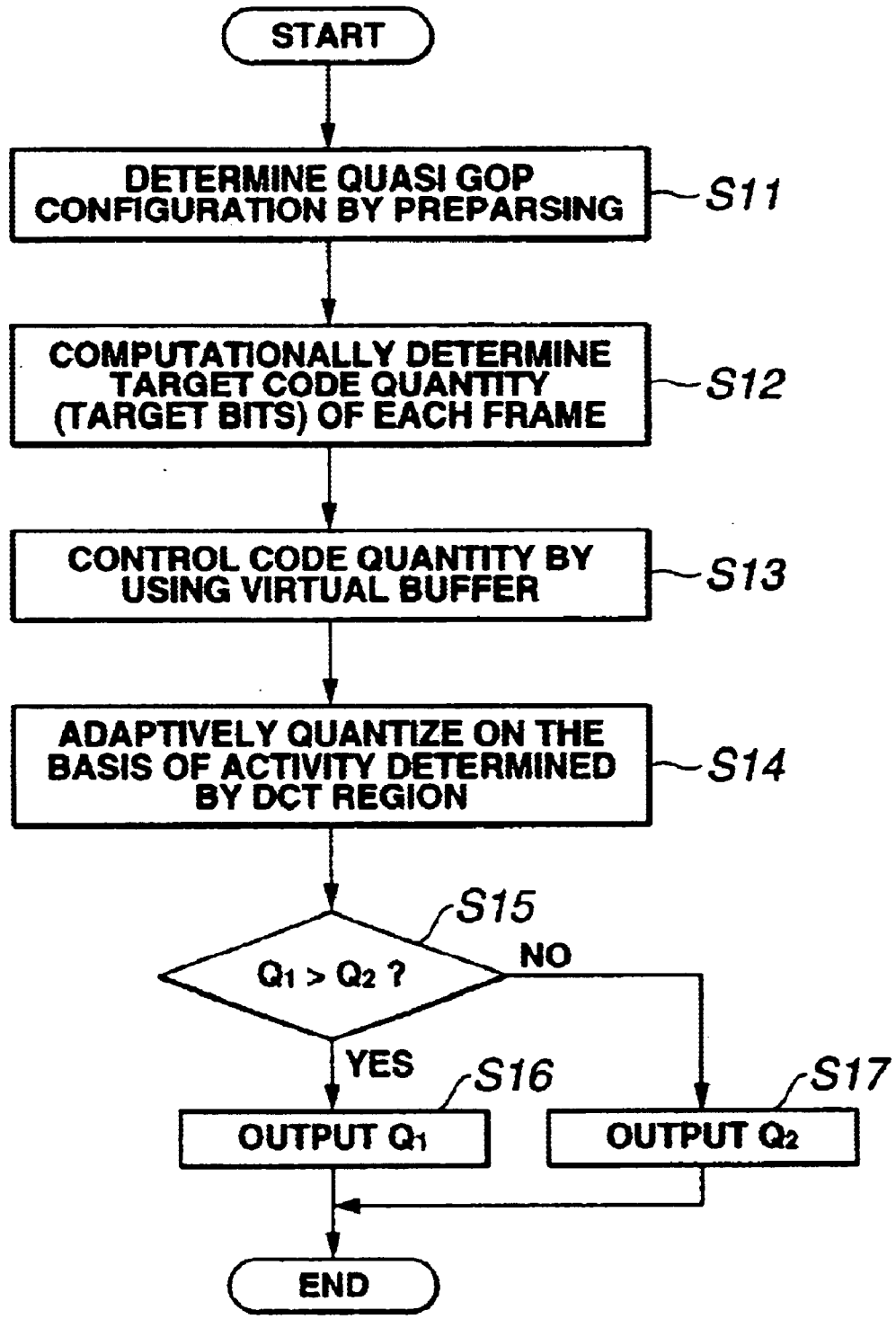
FIG. 5 is a flow chart of the operation of the bit stream controller of the picture information transform apparatus of FIG. 1.

Now, the sequence of operation of the bit rate controller 12 will be described by referring to FIG. 5.

In Step S1, the configuration of the pseudo GOP is determined by preparsing. Then, in Step S2, the target bits of each frame is computed. Subsequently, in Step S3, the number of bits is controlled by using a virtual buffer. Then, in Step S4, an operation of adaptive quantization is performed on the basis of the activity as determined in the DCT region.

Thereafter, in Step S5, the processing operation is branched in either or two ways depending on the answer to the question if the inequality Q1>Q2 holds true or not. If the inequality holds true, Q1 is output in Step S6. If the inequality does not holds true, Q2 is output in Step S7 to terminate the sequence of operation.

The discrete cosine transform coefficients that are quantized by the quantizer 8 are encoded to show a variable length by the variable length decoder 11. Then, as for the DC component of each discrete cosine transform coefficients, the difference between it and the DC component of the coefficient of the preceding block is used as encoded predicted value. However, all the remaining components are arranged one dimensionally according to the preselected scanning mode (zigzag scan or alternate scan) and subsequently encoded to show a variable length by using the number of consecutive 0 coefficients (run) and non-0 coefficients (level) as paired events.

If all the subsequent coefficients equal to 0 in the scanning sequence of a block, a code referred to as EOB (end of block) is output to terminate the variable length encoding operation.

Zigzag scan and alternate scan are described earlier by referring to A and B in FIG. 2.

Figure 6A:
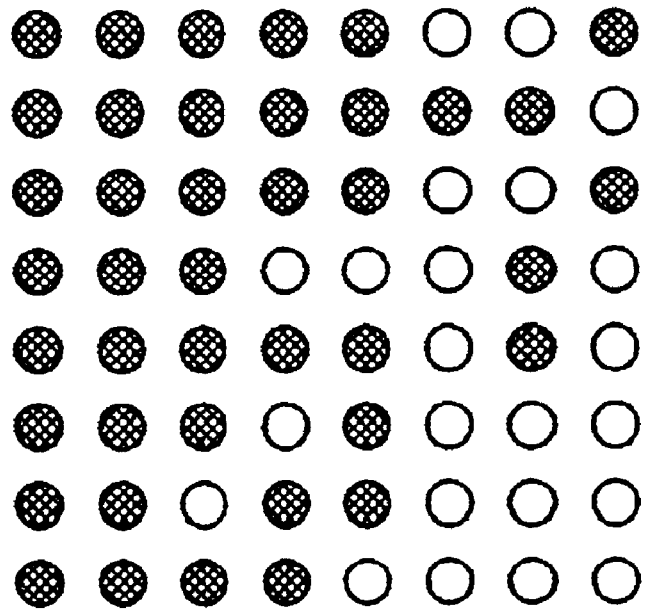
FIG. 6 is a schematic illustration of the advantage of the arrangement of the variable length encoder of the picture information transform apparatus of FIG. 1 when the scanning operation conducted in a zigzag scan mode and is switched to an alternate scan mode after limiting the bandwidth.
Figure 6B:
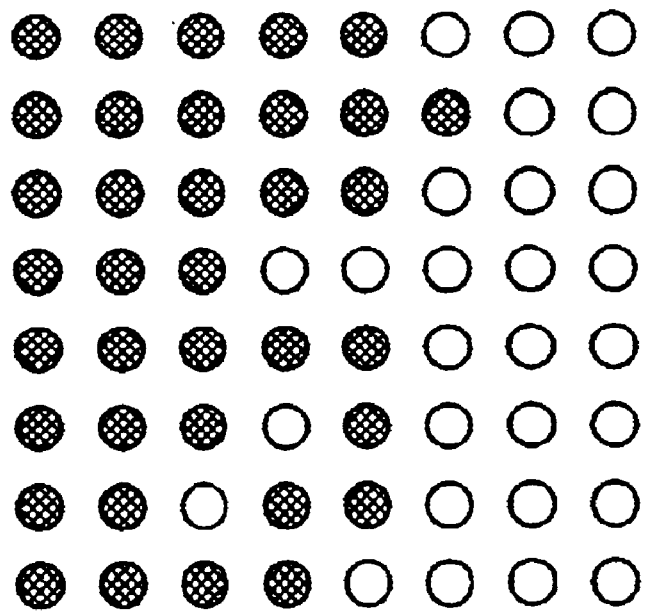

Assume now that the coefficients of a block of the input compressed picture information (bit stream) are arranged as shown in A of FIG. 6, where · indicates a non-0 coefficient and ○ indicates a 0 coefficient.

If the horizontal high frequency components are decimated as shown in A of FIG. 3, the distribution of non-0 coefficient will be as shown in B of FIG. 6.

The scan number of the final non-0 coefficient will be 50 if they are re-encoded, keeping the zigzag scan remaining active, whereas it will be equal 44 if they are encoded once again, switching the scanning mode to alternate scan.

As a result, it is now possible for EOB signal to select a younger scan number if compared with the zigzag scan so that the distortion due to the re-quantization can be reduced if a smaller value is assigned to the width of quantization.

Now, the operation of the motion compensation error correcting section 12 of the picture information transform apparatus of FIG. 1 will be described below.

Firstly, the reason why motion compensation errors occur will be discussed. Assume that the pixel value of the original image is 0 and the width of quantization of the input compressed picture information (bit stream) for the pixel value is Q1, while the width of quantization of the re-encoded compressed picture information (bit stream) for the pixel value is Q2.

When decoded with widths of quantization of Q1 and Q2, the pixel values of the reflectance image are expressed respectively L(Q1) and L(Q2).

With a picture information coding apparatus conforming to MPEG-2, 0-L(Q1) is computed firstly for the pixels of an inter-macro-block and then a discrete cosine transform operation is conducted on the differential value for encoding.

On the other hand, in an picture information transform apparatus that does not comprise the motion compensation error correcting section 12, the picture information decoder decodes the discrete cosine transform coefficients in the compressed picture information (bit stream), presuming that 0-L(Q2) is encoded after a discrete cosine transform, when decoding picture information according to MPEG-2.

Generally Q1=Q2 does not hold true in an picture information transform apparatus as shown in FIG. 1. Thus, errors occur as a result of motion compensation because the above phenomenon arises in P pictures and B pictures.

Additionally, the degradation of image quality that arises in a P picture can propagate into succeeding P pictures and also into B pictures that refer to P pictures to consequently aggravate the degradation of image quality.

The phenomenon that a good image quality is restored at the top of each GOP (drift) occurs because of the above reason.

Now, the principle of the operation of the motion compensation error correcting section 12 will be described below.

The quantified discrete cosine transform coefficients that are output from the quantizer 8 are sent to the variable length encoder 11 and also to the inverse quantizer 13, which inversely quantizes them on the basis of the information on the width of quantization and the quantization matrix and also the information on the inverse quantization matrix.

Then, the second adder 14 determines the difference between the discrete cosine transform coefficients output from the inverse quantizer 13 and the discrete cosine transform coefficients output from the quantizer 8 and the image output of the second adder 14 obtained by the subtraction is input to the inverse discrete cosine transform section 15, which performs an inverse discrete cosine transform operation on it.

The output of the inverse discrete cosine transform section 15 is then stored in the video memory 16 as information on the motion compensation error correction.

Then, the motion compensation predicting section 17 performs an operation of motion compensation according to the information on the mode of motion compensation prediction (field motion compensation prediction mode or frame motion compensation prediction mode and forward prediction mode, backward prediction mode or bidirectional prediction mode), the information on the motion vector and the information on the error correction in the video memory 16 and the data generated as a result of the motion correcting operation is used as corrective value in the space region.

The discrete cosine transform section 18 performs an operation of discrete cosine transform, using the corrective value as input, to obtain the corrective value in the frequency region.

A high speed algorithm as described in "A fast computational algorithm for the discrete cosine transform" (IEEE Trans. Commun., vol. 25, no. 9, pp. 1004–1009, 1977) may be applied to the inverse discrete cosine transform section 15 and the discrete cosine transform section 18.

Since the high frequency components of the horizontal discrete cosine coefficients are replaced by 0 by the band limiter 7, it is possible to reduce the circuit size and the volume of arithmetic operations for the inverse discrete cosine transform section 15 and the discrete cosine transform section 18 by omitting the operation of inverse discrete cosine transform and that of the discrete cosine transform for those components.

Additionally, since the degradation of the color difference signal is less recognizable than that of the luminance signal to the human eyes, the circuit size and the volume of arithmetic operations can be significantly reduced by using the above operation of motion compensation error correction only for the luminance signal, while minimizing the degradation of image quality.

Still additionally, while errors in P pictures propagate into B pictures, those in B pictures do not propagate any further. On the other hand, B pictures include the bidirectional prediction mode and hence require a large volume of arithmetic operations.

Therefore, the circuit size and the volume of arithmetic operations can be significantly reduced by using the above operation of motion compensation error correction only for the P pictures, while minimizing the degradation of image quality.

The capacity of the video memory 16 may be reduced when no operation of motion compensation error correction is conducted on the B pictures.

Furthermore, in the case where all the 8×8 discrete cosine transform coefficients are used for error correction by the motion compensation error correcting section 12 of the picture information transform apparatus of FIG. 1 and the discrete cosine transform mode is the frame DCT mode while the scanning mode of the input compressed picture information (bit stream) is the interlaced scanning mode, substantially no degradation of image quality occurs if the four high frequency components are neglected in the horizontal direction, although a significant degree of degradation of image quality can appear if the errors of the vertical high frequency components are disregarded.

Thus, by utilizing this fact, it is possible to reduce the volume of arithmetic operations of the inverse discrete cosine transform section 15, that of the discrete cosine transform section 18 and the capacity of the video memory 16, while minimizing the degradation of image quality.

More specifically, both the inverse discrete cosine transform section 15 and the discrete cosine transform section 18 perform ordinary processing operations of eight degrees in the vertical direction but they perform operations of only four degrees in the horizontal direction.

As a result, the resolution of the video memory 16 is reduced to ½ in the horizontal direction and hence it is possible to reduce its capacity.

Note, however, that then the motion compensation predicting section 17 is required to operate for motion compensation with a ¼ pixel accuracy.

As shown in FIG. 7, in this processing operation, it is possible to sufficiently reduce the possible degradation of image quality that may arises due to the motion compensation errors by utilizing the technique of linear interpolation as a function of the value of the motion vector in the compressed picture information (bit stream).

Either of the two measures as described below may be taken for the horizontal direction.

The first one is to perform an operation of inverse discrete cosine transform of four degrees only on the low frequency coefficients of four degrees out of the discrete cosine coefficients of eight degrees so that the discrete cosine transformer outputs corrective values for the 4×8 frequency regions by performing an operation of discrete cosine transform of four degrees in the horizontal direction on the 4×8 corrective values of each block in the pixel region formed by the motion compensation of the video memory 16.

The volume of processing operation can be further reduced by using a high speed algorithm for the inverse discrete cosine transform and the discrete cosine transform of four degrees.

Figure 8:
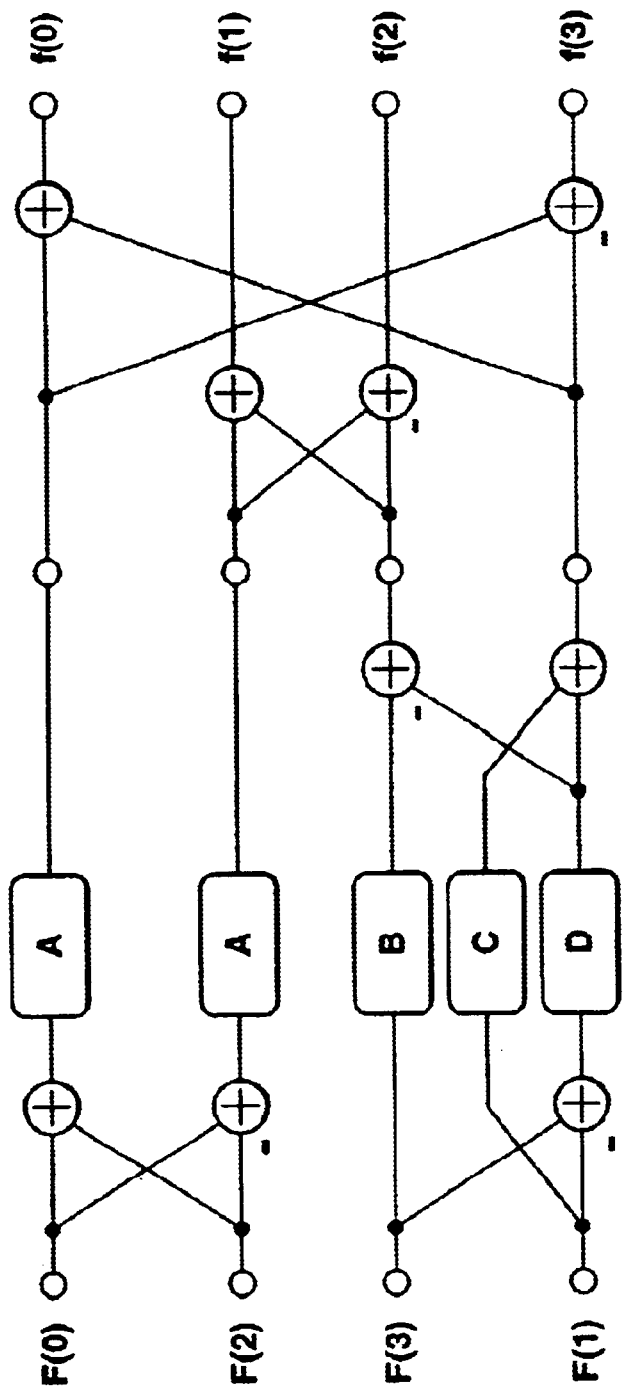
FIG. 8 is a flow chart of an operation of discrete cosine transform/inverse discrete cosine transform of four degrees according to the Wang's high speed algorithm.

FIG. 8 schematically illustrates a technique using the Wang's algorithm (Zhong diffraction efficiency Wang, "Fast Algorithms for the Discrete W Transform and for the Discrete Fourier Transform", IEEE Tr. ASSP-32, No. 4, pp. 803–816, August 1984).

Referring to FIG. 8, an inverse discrete cosine transform is realized by using F(0) through F(3) as input and f(0) through f(3) as output, while a discrete cosine transform is realized by using f(0) through f(3) as input and F(0) through F(3) as output.

With the second measure, the inverse discrete cosine transform section 15 replaces the four high frequency coefficients with 0s and performs an operation of inverse discrete cosine transform of eight degrees as horizontal processing operation. Then, it carries out an decimating or averaging operation to output error correction values of four points in the pixel region. The discrete cosine transform section 18 interpolates the error correction values of four points in the pixel region obtained as a result of motion compensation to obtain error correction values of eight points and, after performing an operation of discrete cosine transform on them, takes out the low frequency coefficients of up to four degrees to output corrective values in the 4×8 frequency regions.

The volume of processing operations of each of the inverse discrete cosine transform section 15 and the discrete cosine transform section 18 can be further reduced when a matrix equivalent to the series of processing operation is prepared and applied directly to the input coefficients.

Assume that the matrices equivalent to the decimating operation and the averaging operation of the inverse discrete cosine transform section 15 to be conducted after replacing the four high frequency coefficients with 0s and performing an inverse discrete cosine transform of eight degrees are respectively iD4_deci and iD4_ave, where the matrices equivalent to the decimating operation and the averaging operation of discrete cosine transform section 18 to be conducted in a similar manner are respectively D4_deci and D4_ave.

The matrices iD4_deci and iD4_ave are shown respectively in A and B of FIG. 9. Assume that the equations below holds true for the matrices D4_deci and D4_ave respectively. "t" in the formulas denotes a transposed matrix.

$$D_{4\_deci} = {}^t(iD_{4\_deci}) \tag{12}$$

$$D_{4\_ave} = {}^t(iD_{4\_ave}) \tag{13}$$

It is known that generally the degradation of the color difference signal is less recognizable than that of the luminance signal to the human eyes. Therefore, it is possible to further reduce the volume of processing operation for the color difference signal.

Figure 10:
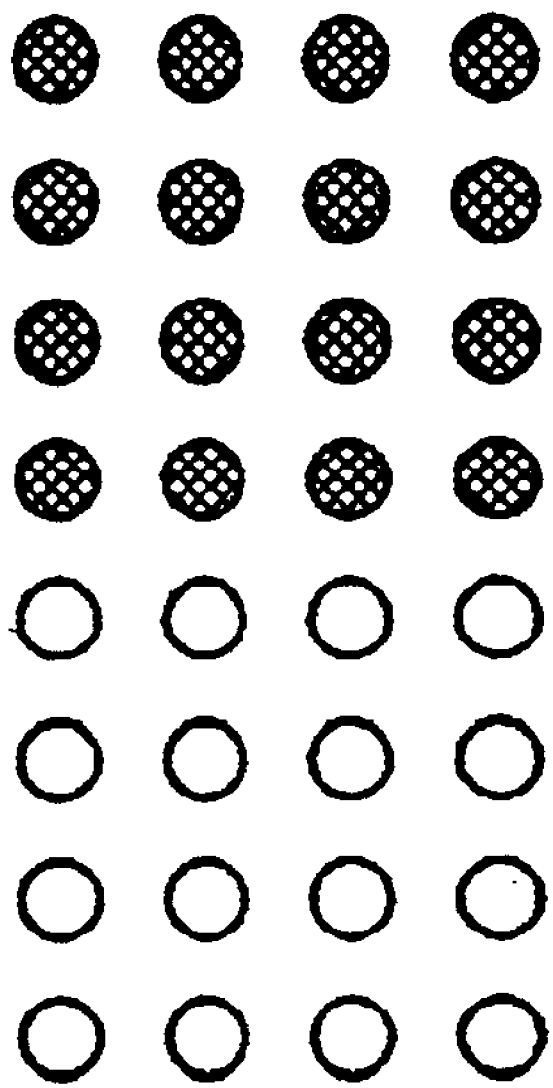
FIG. 10 is a schematic illustration of the method of reducing the volume of operation of processing the color difference signal of the inverse discrete cosine transform section and the discrete cosine transform section of the picture information transform apparatus of FIG. 1.

More specifically, as shown in FIG. 10, it can be so arranged that the inverse discrete cosine transform section 15 and the discrete cosine transform section 18 uses only the low frequency coefficients of the vertical direction (e.g., 4×4) for the error correction with regards to the error correction components of the color difference signal out of the above 4×8 error correction coefficients and replaces the remaining high frequency coefficients with 0s in order to further reduce the volume of processing operation for error correction.

Meanwhile as described in "A Theoretical Analysis of the MPEG Compression Efficiency and an Application to Bit Rate Control" (Kotoh, Ohta, Technol. Rep. of Telecom. Soc., IE-95, DSP95-10, May 1995), the bit rate control method as defined in Test Model 5 does not necessary provide a good image quality in MPEG-2 video encoders.

The above cited document proposes a method as summarized below as means for assigning an optimal number of bits to each frame in a GOP in order to obtain a good image quality. Assume that the number of I pictures, that of P pictures and that of B pictures that are not encoded yet in a GOP are $N_I$, $N_P$ and $N_B$ and number respectively and the numbers of bits assigned to them are respectively $R_I$, $R_P$ and $R_B$. Then, the fixed rate requirement is given by formula (14) below.

$$R = N_I R_I + N_P R_P + N_B R_B \tag{14}$$

If the quantization step sizes of the pictures of the three types under the fixed rate condition of formula (14) above are respectively $Q_I$, $Q_P$ and $Q_B$ and the degrees for corelating the quantization step sizes and the reproduction error variances is m (to assume that the minimalization of the average of the quantization step sizes of m degrees by turn minimalizes the reproduction error variances), the value of formula (15) below should be made minimal.

$$\frac{N_I \cdot Q_I^m + N_P \cdot Q_P^m + N_B \cdot Q_B^m}{N_I + N_P + N_I} \tag{15}$$

Note that the average quantization scale Q and the bit rate R of each frame and the complexity of the frame which is expressed by the parameters that are also used in Test Model 5 are correlated in a manner as described below.

$$Q \cdot R^\alpha = X \tag{16}$$

The values as expressed respectively by the formulas below are obtained as optimal when the values that minimizes $R_I$, $R_P$ and $R_B$ are computed on the basis of the constraint of formula (14) by using Lagrange's undetermined multiplier method.

$$\overline{R}_I = \frac{R}{1 + N_P \cdot \left(\frac{X_P}{X_I}\right)^{\frac{m}{1+m\alpha}} + N_B \cdot \left(\frac{X_B}{X_I}\right)^{\frac{m}{1+m\alpha}}} \quad (17)$$

$$R_P = \frac{R}{N_P + N_B \cdot \left(\frac{X_B}{X_P}\right)^{\frac{m}{1+m\alpha}}} \quad (18)$$

$$R_B = \frac{R}{N_B + N_P \cdot \left(\frac{X_P}{X_B}\right)^{\frac{m}{1+m\alpha}}} \quad (19)$$

If $\alpha=1$, the relationship between the formulas (17) through (19) and the fist step of the bit rate control method as defined in Test Model 5 is as follows.

It will be appreciated that the formulas (17) through (19) are used to adaptively determine the values of $K_P$ and $K_B$ that are parameters for bit rate control and represent the complexity $X_I$, the complexity $X_P$ and the complexity $X_B$ of each frame as shown by formula (20) below.

$$K_P = \left(\frac{X_I}{X_P}\right)^{\frac{1}{1+m}}; \quad K_B = \left(\frac{X_I}{X_B}\right)^{\frac{1}{1+m}} \quad (20)$$

The above document shows that a good image quality can be obtained by selecting 0.6 to 1.2 for the value of 1/(1+m).

Figure 11:
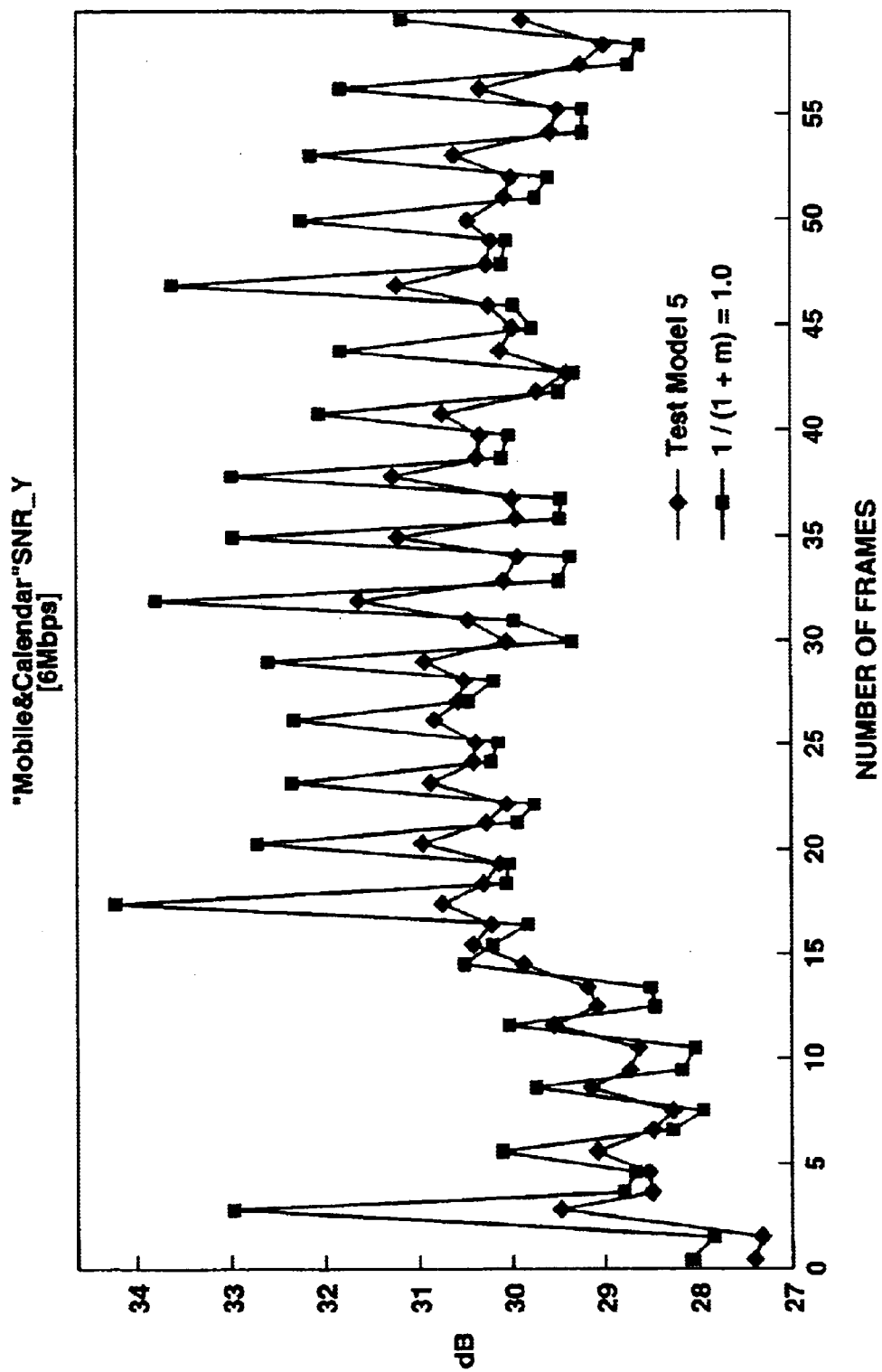
FIG. 11 is a graph schematically illustrating the signal to noise ratio (pSNR) obtained by an operation of assigning a number of bits to the CCIR test sequence "Mobile & Calendar", using a picture information compressing apparatus conforming to MPEG-2 as compared with that of the original image.

FIG. 11 is a graph schematically illustrating the signal to noise ratio (pSNR) obtained by an operation of assigning a number of bits to the CCIR (Comite Consultantif Internationale des Radio Communications) test sequence "Mobile & Calendar", using a picture information compressing apparatus conforming to MPEG-2 as compared with that of the original image.

The pSNR is obtained by using equation (21) below, where MSE is made to represent the mean square error relative to the original image.

$$pSNR = 10 \log_{10} \frac{255^2}{MSE} \quad (21)$$

In the graph of FIG. 11, the broken line linked by "■s" represents the values obtained by selecting 1.0 for 1/(1+m) and the broken line linked by "♦s" represents the corresponding values of bit assignment of Test Model 5 shown for the purpose of reference.

Figure 12:
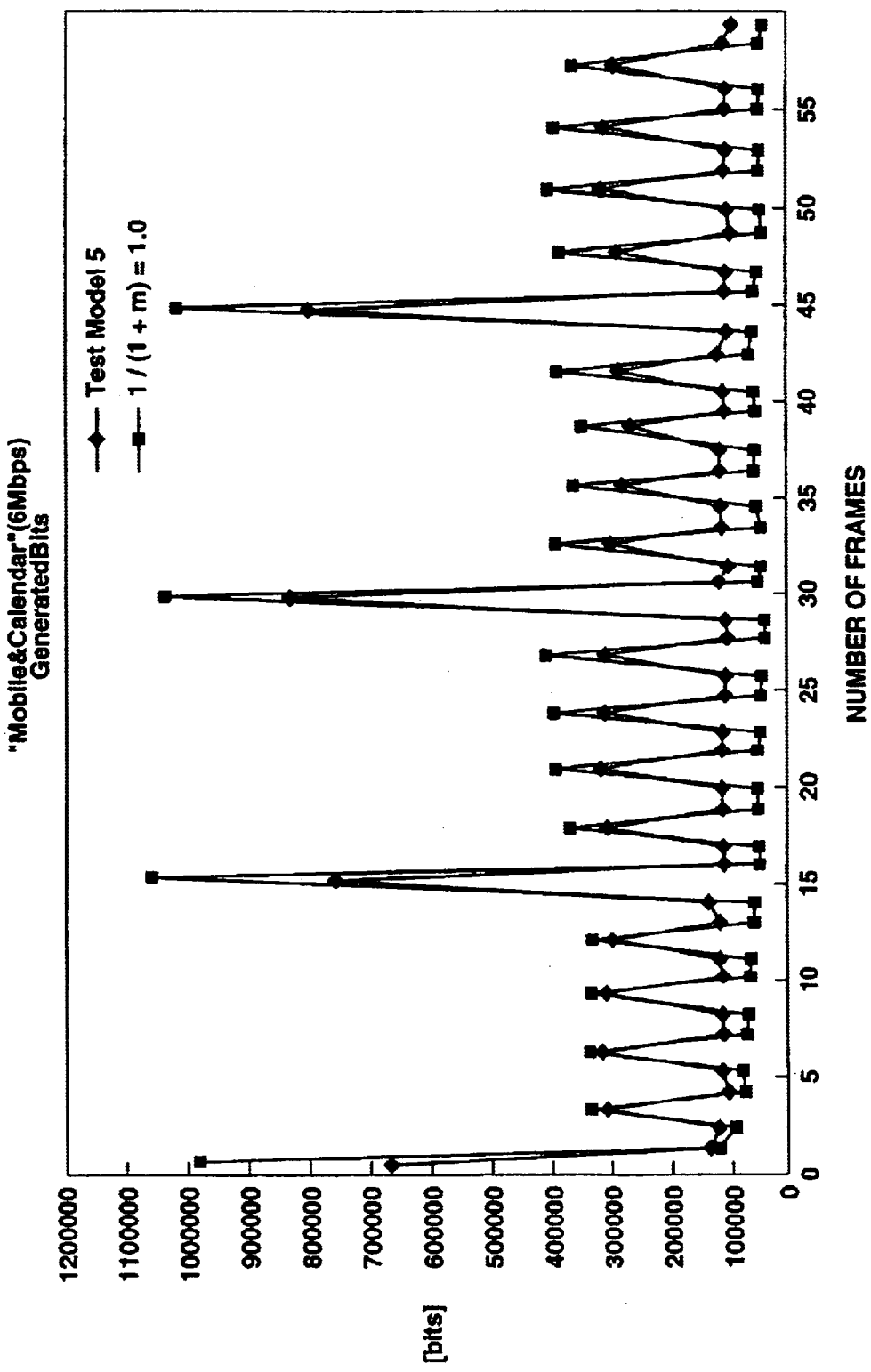
FIG. 12 is a graph schematically illustrating the number of bits assigned to each frame in the operation of FIG. 11.

FIG. 12 is a graph schematically illustrating the number of bits assigned to each frame in the operation of FIG. 11.

The broken lines linked respectively by "■s" and "♦s" in FIG. 12 refer to the respective sources that are same as those of FIG. 11.

As seen from FIG. 11, a remarkable improvement of image quality can be achieved by using the technique of formulas (17) through (19) if compared with the technique of Test Model 5.

The Mobile & Calendar" represents a sequence of motions that proceed slowly and shows a high correlation between frames. As seen from FIG. 12, the technique of using formulas (17) through (19) assigns more bits to the I picture than that of Test Model 5 to consequently improve the quality of the I picture and hence that of the P pictures and the B pictures which refer to the I picture in such a sequence.

The above cited document describes the effect of using the formulas (17) through (19) in a compressed picture information apparatus conforming to MPEG-2 and a similar effect can be by using a picture information transform apparatus as shown in FIG. 1.

Now, an embodiment of the present invention will be described on the basis of the above description of a picture information transform apparatus having the above described configuration.

Figure 13:
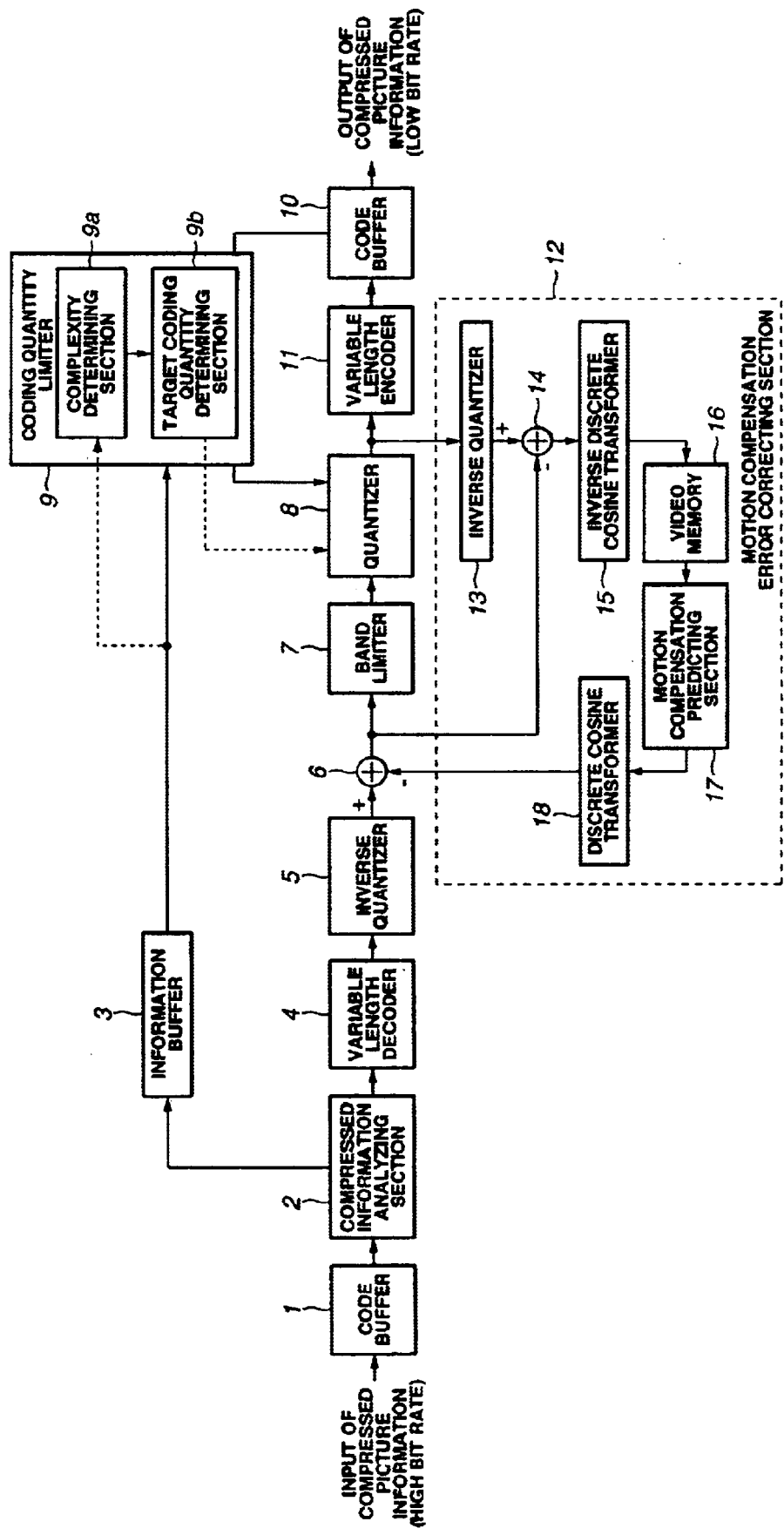
FIG. 13 is a schematic block diagram of a picture information transform apparatus where the bit rate controller includes a complexity computing section and a target bit rate computing section.

FIG. 13 is a schematic block diagram of the embodiment of picture information transform apparatus according to the invention where the bit rate controller 9 includes a complexity computing section 28 and a target bit rate computing section 29.

Since all the components of this embodiment are same as those of the above described picture information transform apparatus except the bit rate controller 9, they are denoted respectively by the same reference symbols and will not be described any further.

This embodiment of picture information transform apparatus comprises a first code buffer 1 for storing input compressed picture information, a compressed information analyser 2 for analysing the compressed picture information output from the first code buffer, an information buffer 3 for storing the compressed information output from the compressed information analyser 2 and a variable length encoder 4 for performing a variable length encoding operation on the compressed picture information output from the compressed information analyser 2.

The picture information transform apparatus further comprises an inverse quantizer 5 for inversely quantizing the picture information decoded by the variable length encoder 4, a first adder 6 for subtracting the output of the motion compensation error correcting section 12 from the output of the inverse quantizer 5, a band limiter 7 for limiting the bandwidth for the output of the first adder 6 and a bit rate controller 9 for controlling the bit rate on the basis of the output of the information buffer 3.

The bit rate controller 9 includes a complexity computing section 9a for computationally determining the image complexity on the basis of the output of the information buffer 3 and a target bit rate computing section 9b for computationally determining the target bit rate on the basis of the output of the complexity computing section 9a. The operation of the bit rate controller 9 will be described hereinafter.

The picture information transform apparatus additionally comprises a quantizer 8 that operates for quantizing on the basis of the output of the band limiter 7 and that of the target rate computing section 9b of bit rate controller 9, a variable length encoder 11 that performs a variable length encoding operation on the output of the quantizer 8, a motion compensation error correcting section 12 for correcting the error of motion compensation on the basis of the output of the quantizer 11 and a second code buffer 10 for storing the output of the variable length encoder 11 according to the control of the bit rate controller 9.

The motion compensation error correcting section 12 includes an inverse quantizer 13 for inversely quantizing the output of the quantizer 8, a second adder 14 for subtracting the output of the first adder 6 from that of the inverse quantizer 13 and an inverse discrete cosine transform section 15 for inversely quantizing the output of the second adder 14.

The motion compensation error correcting section 12 includes a video memory for storing the output images of the inverse discrete cosine transform section 15, a motion compensation predicting section 17 for predicting the motion compensation for the output of the video memory 16 and a discrete cosine transform section 18 for performing an operation of discrete cosine transform on the output of the motion compensation predicting section 17 Now, the operation of this embodiment of picture information transform apparatus will be described below. Since this embodiment of picture information transform apparatus is identical with the picture information transform apparatus illustrated in FIG. 1 except the complexity computing section 9a and the target bit rate computing section 9b. Only these sections will be discussed below.

The information buffer 3 stores information on the average quantization scales $Q_I$, $Q_P$ and $Q_B$ and the assigned numbers of bits $R_I$, $R_P$ and $R_B$ of the I picture, the P pictures and the B pictures of each frame contained in the input compressed picture information (bit stream).

The complexity computing section 9a computes the complexities of $X_I$, $X_P$ and $X_B$ of each frame on the basis of this information.

$$X_I = Q_I \cdot R_I \quad (22)$$

$$X_P = Q_P \cdot R_P \quad (23)$$

$$X_B = Q_B \cdot R_B \quad (24)$$

The target bit rate computing section 29 computationally determines the parameters $K_P$ and $K_B$ to be used for assigning a bit rate to each frame by using formula (25) below which is similar to the above described formula (20).

$$K_P = (X_I, X_P) = \left(\frac{X_I}{X_P}\right)^{\frac{1}{1+m}}; \quad K_B(X_I X_B) = \left(\frac{X_I}{X_B}\right)^{\frac{1}{1+m}} \quad (25)$$

As in the case of formula (20), the number of bits assigned to each frame can be optimized by selecting 0.6 to 1.2 for the value of 1/(1+m).

Since the equation (25) does not require any exponential computations, a high computation speed can be realized by selecting 1.0 for the value of 1/(1+m).

If a value other than 1.0 is selected for 1/(1+m), a high computation speed can also be realized by preparing a table in advance and referring to the table in the computation procedure.

As in the case of using formulas (2) through (4), the target bits $T_I$, $T_P$ and $T_B$ of each frame can be determined by using the following formulas on the basis of the parameters $K_P$ and $K_B$ that are obtained by using the above formula (25).

$$T_I = \frac{X(I)}{X(I) + \sum_{i \in \Omega}\left(\frac{1}{K_P(X(I), X(P_i))} \cdot X(Pi)\right) + \sum_{i \in \Omega}\left(\frac{1}{K_B(X(I), X(B_i))} \cdot X(Bi)\right)} \times R \quad (26)$$

$$T_P = \frac{\frac{1}{K_P(X(I), X(P_i))} \cdot X(P_i)}{X(I) + \sum_{i \in \Omega}\left(\frac{1}{K_P(X(I), X(P_i))} \cdot X(Pi)\right) + \sum_{i \in \Omega}\left(\frac{1}{K_B(X(I), X(B_i))} \cdot X(Bi)\right)} \times R \quad (27)$$

$$T_B = \frac{\frac{1}{K_B(X(I), X(B_i))} \cdot X(B_i)}{X(I) + \sum_{i \in \Omega}\left(\frac{1}{K_P(X(I), X(P_i))} \cdot X(Pi)\right) + \sum_{i \in \Omega}\left(\frac{1}{K_B(X(I), X(B_i))} \cdot X(Bi)\right)} \times R \quad (28)$$

Note that the parameters $K_P$ and $K_B$ are required for the bit rate controller 27 to obtain the initial values of the virtual buffers at the start of the sequence. For the purpose of simplifying the computations, the following values are used for $K_P$ and $K_B$ when determining the initial values.

$$K_P = 1.0; \quad K_B = 1.4 \quad (29)$$

Figure 14:
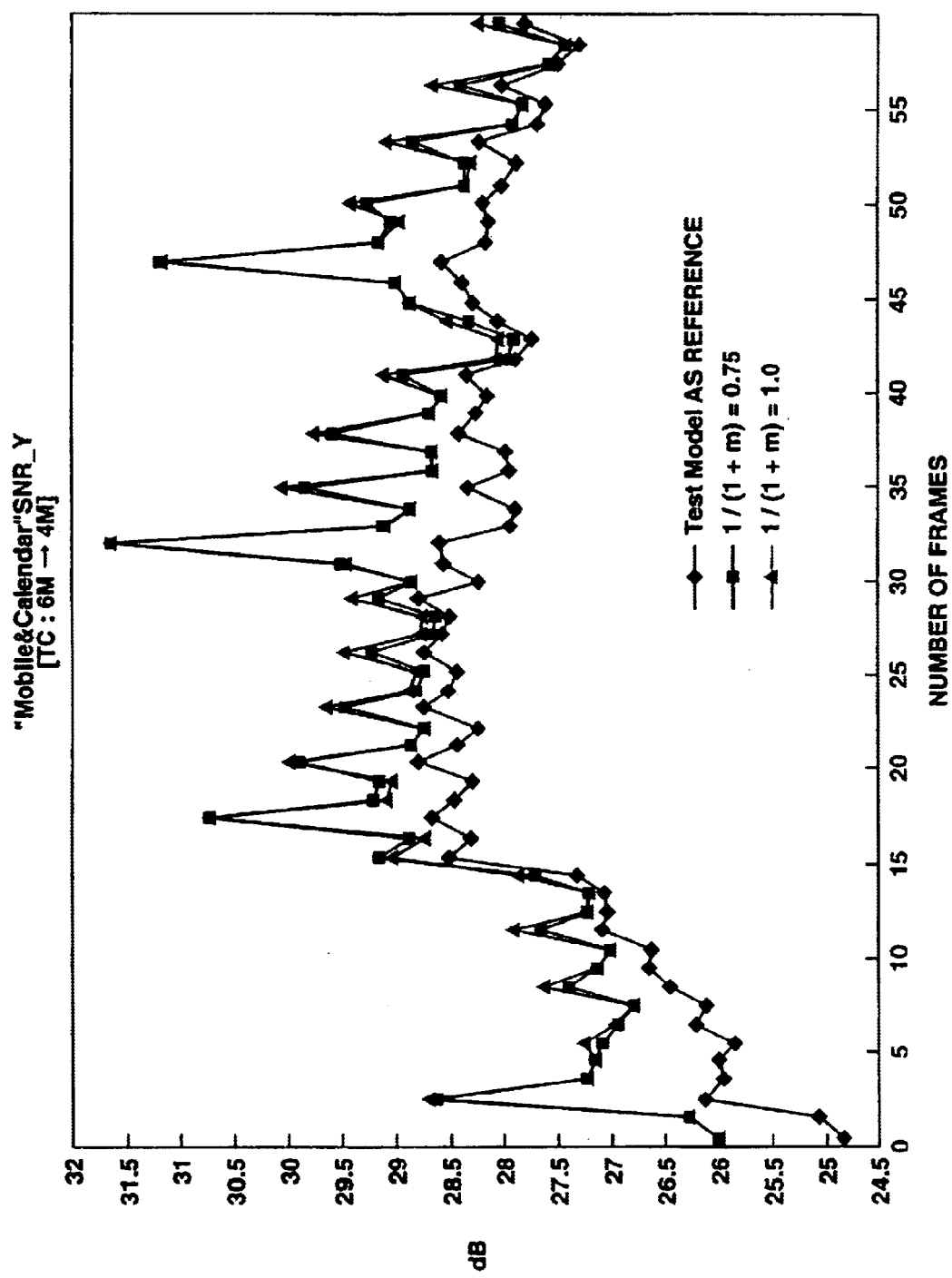
FIG. 14 is a graph schematically illustrating the shift of the pSNR relative to the original image that arises when the compressed picture information (bit stream) obtained by compressing "Mobile & Calender" to 6 Mbps is transformed into 4 Mbps by the picture information transform apparatus of FIG. 13.

FIG. 14 is a graph schematically illustrating the shift of the pSNR relative to the original image that arises when the compressed picture information (bit stream) obtained by compressing "Mobile & Calender" to 6 Mbps is tranformed into 4 Mbps by the picture information transform apparatus of FIG. 13.

In FIG. 14, the broken line linked by "■s" represents the values obtained by selecting 0.75 for 1/(1+m) and the broken line linked by "♦s" represents the values obtained by selecting 1.0 for 1/(1+m), whereas the broken line linked by "Δ" represents the corresponding values of bit assignment of Test Model 5 shown for the purpose of reference.

As see from the graph, the picture information transform apparatus of FIG. 13 provides an effect similar to that of the picture information transform apparatus of FIG. 1 as described above by referring to FIG. 11.

Figure 15:
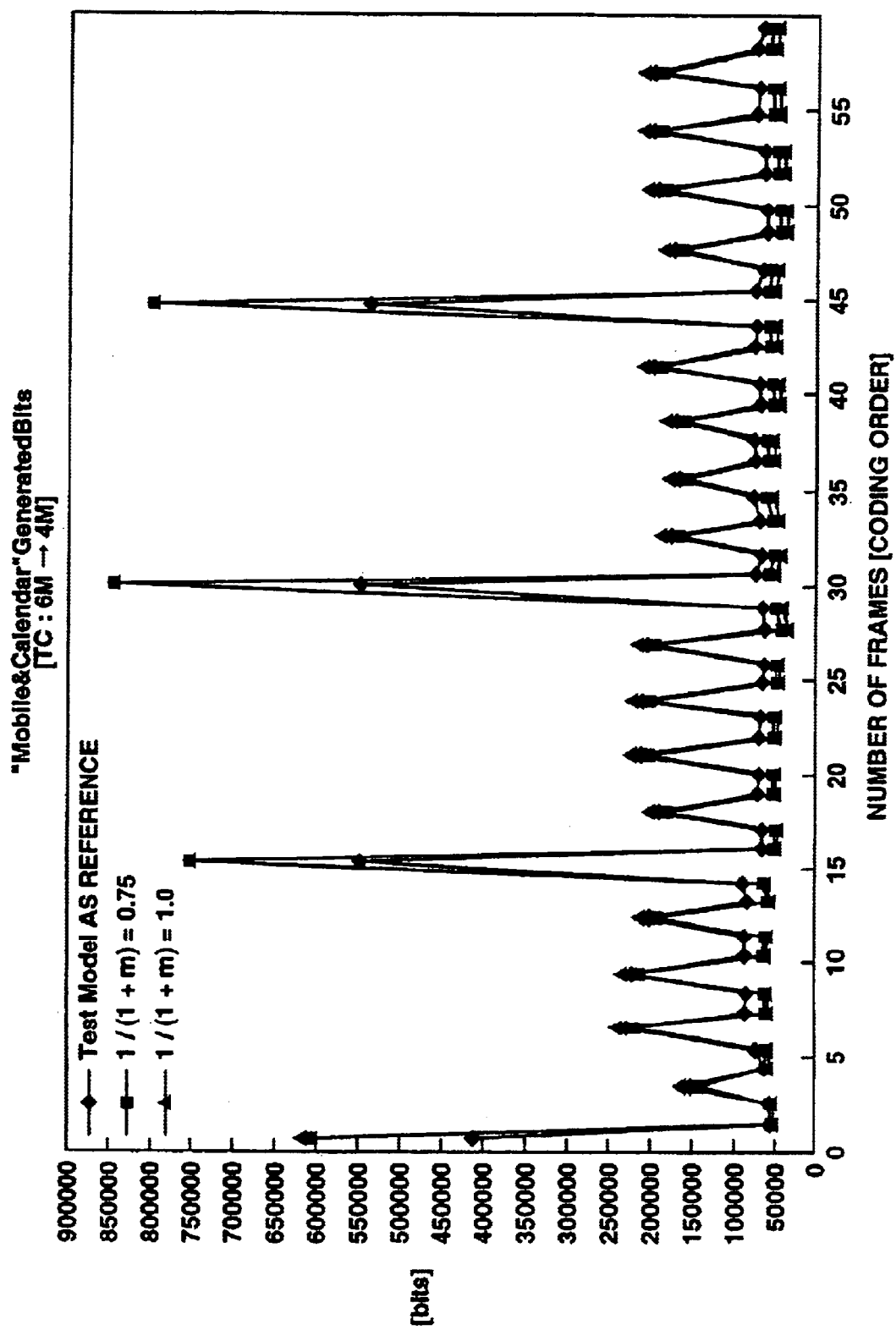
FIG. 15 is a graph schematically illustrating the shift of the number of bits assigned to each frame in the operation of FIG. 14.
Figure 16:
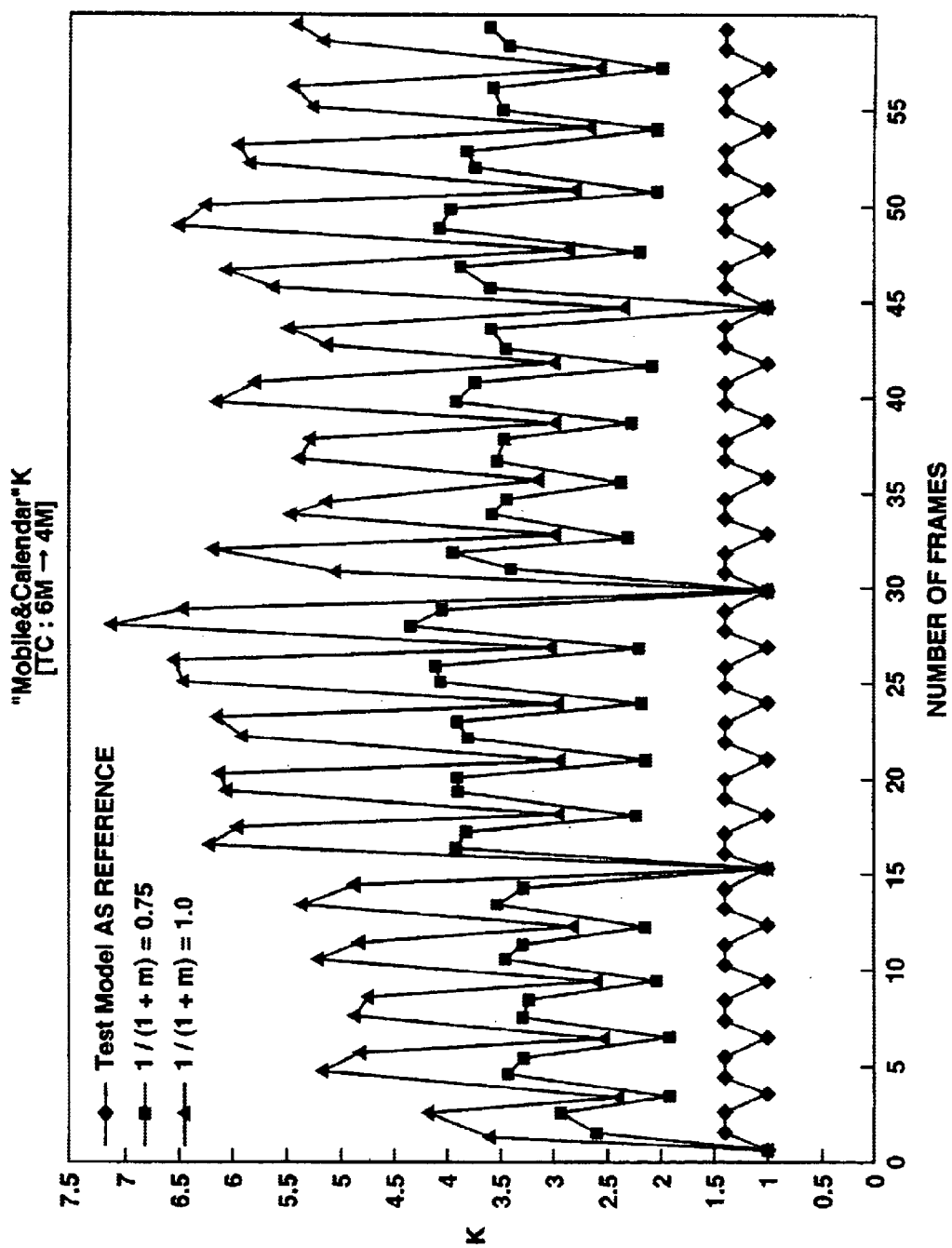
FIG. 16 is a graph schematically illustrating the shift of parameters $K_P$, $K_B$ for each from in the operation of FIG. 14.

FIG. 15 is a graph schematically illustrating the shift of the number of bits assigned to each frame in the operation of FIG. 14 and FIG. 16 is a graph schematically illustrating the shift of parameters $K_P$, $K_B$ for each obtained by using the equation (25).

The broken lines linked respectively by "■s", "♦s" and "" in FIGS. 15 and 16 refer to the respective sources that are same as those of FIG. 14.

While the present invention is described above in terms of compressed picture information (bit stream) obtained by the technique of MPEG-2 and used as input, an effect similar to that of reducing the bit rate of a picture information transform apparatus according to the invention can be obtained when dealing with compressed. picture information (bit stream) encoded by means of techniques of orthogonal transform and motion compensation typically conforming to co-called MPEG-1 or H. 263.

What is claimed is:

1. A picture information transform apparatus for receiving as input the compressed picture information of a plurality of picture type obtained by coding the picture information by means of orthogonal transform and motion compensation, said apparatus comprising:

a decoding means for decoding the input compressed picture information to the picture information;

a coding means for coding the picture information obtained by the decoding of said decoding means; and a control means for controlling the target coding quantity of each of the coded pictures of respective picture type by adaptively using a plurality of parameters to be used as coefficients of the contents of each of the coded pictures of respective picture type on the basis of the contents of each of the coded pictures of respective picture type at the time of coding by said coding means, wherein, said compressed picture information is prepared on the basis of a unit of group of pictures including Intra-coded pictures, Predictive-coded pictures forwardly predictively coded in the display sequence and Bidirectionally predictive-coded pictures bi-directionally predictively coded in the display sequence, and said plurality of parameters include a first parameter $K_P$ operating as the coefficient for the contents of said Predictive-coded picture as determined on the basis of ratio $X_P/X_I$ of the complexity $X_P$ of said Predictive-coded picture to the complexity $X_I$ of said Intra-coded picture and a second parameter $K_B$ operating as the coefficient for the contents of said Bidirectionally predictive-coded picture as determined on the basis of the ratio $X_B/X_I$ of the complexity $X_B$ of said Bidirectionally predictive-coded picture to the complexity $X_I$ of said Intra-coded picture, provided that the coefficient of the contents of the Intra-coded picture is equal to 1, where $X_I$ represents the complexity of said Intra-coded picture, $X_P$ represents the complexity of said Predictive-coded picture and $X_B$ represents the Bidirectionally predictive-coded picture.

2. The picture information transform apparatus according to claim 1, wherein said first parameter $K_P$ and said second parameter $K_B$ are given by the formula below:

$$K_P=(X_I/X_P)^{1/1+m}; K_B=(X_I/X_B)^{1/1+m}.$$

3. The picture information transform apparatus according to claim 2, further comprising:
   a detection means for detecting the complexity $X_I$ of said Intra-coded picture, the complexity $X_P$ of said Predictive-coded picture and the complexity $X_B$ of said Bidirectionally predictive-coded picture from said compressed picture information.

4. The picture information transform apparatus according to claim 2, wherein a value between 0.6 and 1.2 is selected for the value of the exponent $1/(1+m)$ of said first parameter $K_P$ and said second parameter $K_B$.

5. The picture information transform apparatus according to claim 2, wherein the exponent of said first parameter $K_P$ and said second parameter $K_B$ are computed by referring to a preselected table.

6. The picture information transform apparatus according to claim 2, wherein a value of 1.0 is selected for the value of the exponent $1/(1+m)$ of said first parameter $K_P$ and said second parameter $K_B$.

7. The picture information transform apparatus according to claim 1, wherein initial values of said first parameter $K_P=1.0$ and said second parameter $K_B=1.4$ are selected for the purpose of adaptively using said first parameter $K_P$ and said second parameter $K_B$.

8. A picture information transform method for receiving as input the compressed picture information of a plurality of picture type obtained by coding the picture information by means of orthogonal transform and motion compensation, said method comprising:
   a decoding step for decoding the input compressed picture information to the picture information;
   a coding step for coding the picture information obtained by the decoding of said decoding step; and
   a control step for controlling the target coding quantity of each of the coded pictures of respective picture type by adaptively using a plurality of parameters to be used as coefficients of the contents of each of the coded pictures of respective picture type on the basis of the contents of each of the coded pictures of respective picture type at the time of coding by said coding means, wherein, said compressed picture information is prepared on the basis of a unit of group of pictures including Intra-coded pictures, Predictive-coded pictures forwardly predictively coded in the display sequence and Bidirectionally predictive-coded pictures bi-directionally predictively coded in the display sequence, and said plurality of parameters include a first parameter $K_P$ operating as the coefficient for the contents of said Predictive-coded picture as determined on the basis of ratio $X_P/X_I$ of the complexity $X_P$ of said Predictive-coded picture to the complexity $X_I$ of said Intra-coded picture and a second parameter $K_B$ operating as the coefficient for the contents of said Bidirectionally predictive-coded picture as determined on the basis of the ratio $X_B/X_I$ of the complexity $X_B$ of said Bidirectionally predictive-coded picture to the complexity $X_I$ of said Intra-coded picture, provided that the coefficient of the contents of the Intra-coded picture is equal to 1, where $X_I$ represents the complexity of said Intra-coded picture, $X_P$ represents the complexity of said Predictive-coded picture and $X_B$ represents the Bidirectionally predictive-coded picture.

9. The picture information transform method according to claim 8, wherein said first parameter $K_P$ and said second parameter $K_B$ are given by the formula below:

$$K_P=(X_I/X_P)^{1/1+m}; K_B=(X_I/X_B)^{1/1+m}.$$

10. The picture information transform method according to claim 9, further comprising:
   a detection step for detecting the complexity $X_I$ of said Intra-coded picture, the complexity $X_P$ of said Predictive-coded picture and the complexity $X_B$ of said Bidirectionally predictive-coded picture from said compressed picture information.

* * * * *